(12) United States Patent
Wicker

(10) Patent No.: US 8,707,028 B2
(45) Date of Patent: *Apr. 22, 2014

(54) CERTIFICATE-BASED COOKIE SECURITY

(71) Applicant: International Business Machines Corporation, Armonk, NY (US)

(72) Inventor: Jason M. Wicker, Pittsboro, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/633,484

(22) Filed: Oct. 2, 2012

(65) Prior Publication Data

US 2013/0042104 A1    Feb. 14, 2013

Related U.S. Application Data

(63) Continuation of application No. 13/181,890, filed on Jul. 13, 2011.

(51) Int. Cl.
*H04L 29/06* (2006.01)
*G06F 21/00* (2013.01)

(52) U.S. Cl.
CPC ........ *H04L 63/0823* (2013.01); *H04L 63/1466* (2013.01); *G06F 21/00* (2013.01)
USPC ................. 713/156; 726/10; 726/14

(58) Field of Classification Search
CPC .. H04L 63/0823; H04L 63/1466; G06F 21/00
USPC ............. 713/150, 151, 156, 160, 175, 176; 726/3, 4, 26, 10, 14
See application file for complete search history.

(56) References Cited

U.S. PATENT DOCUMENTS

| 6,351,812 | B1* | 2/2002 | Datar et al. ................... 713/182 |
| 7,430,755 | B1 | 9/2008 | Hughes et al. |
| 2002/0133700 | A1 | 9/2002 | Maurin et al. |
| 2003/0110259 | A1 | 6/2003 | Chapman et al. |
| 2005/0228886 | A1* | 10/2005 | Cain et al. ..................... 709/226 |

(Continued)

FOREIGN PATENT DOCUMENTS

EP    1965560 A1 * 9/2008

OTHER PUBLICATIONS

Birgit Pfitzmann, "Federated Identity Management Protocols" 2005, IBM pp. 153-174.*

*Primary Examiner* — Samson Lemma
(74) *Attorney, Agent, or Firm* — Jeffrey S. LaBaw; David H. Judson

(57) ABSTRACT

A cookie attribute for use during secure HTTP transport sessions. This attribute points to a server-supplied certificate and, in particular, a digital certificate. The cookie attribute includes a value, and that value is designed to correspond to one or more content fields in the digital certificate. During a first https session, a first web application executing on a first server provides a web browser with the cookie having the server certificate identifier attribute set to a value corresponding to a content field in a server certificate. Later, when the browser is accessing a second server during a second https session, the browser verifies that the value in the cookie matches a corresponding value in the server certificate received from the second server before sending the cookie to the second server. This approach ensures that the cookie is presented only over specified https connections and to trusted organizations.

11 Claims, 5 Drawing Sheets

(56) References Cited

U.S. PATENT DOCUMENTS

| | | |
|---|---|---|
| 2006/0059346 A1 | 3/2006 | Sherman et al. |
| 2009/0037997 A1* | 2/2009 | Agbabian et al. ............... 726/10 |
| 2010/0050243 A1 | 2/2010 | Hardt |
| 2010/0169648 A1* | 7/2010 | Yoshida ........................ 713/175 |
| 2012/0233705 A1* | 9/2012 | Boysen et al. .................. 726/29 |

* cited by examiner

CERTIFICATE-BASED COOKIE SECURITY

BACKGROUND OF THE INVENTION

1. Technical Field

This disclosure relates generally to web application security and, in particular, to a method and system for ensuring that a web browser presents a web application cookie only to trusted servers.

2. Background of the Related Art

HTTP cookies (see IETF RFC6265) provide a way of managing sessions and state between web browsers and web servers using the HTTP protocol. In a typical browser-server interaction, a Web application sets a cookie, and the cookie is returned to the browser to present with subsequent requests until the cookie is expired by the web application. Web applications leverage cookies for security purposes, such as authentication, and session control.

An unauthorized party in possession of a cookie may compromise a web application's security. Thus, it is desirable to provide techniques to protect cookies from misappropriation. A known approach in the art is to defend against a particular type of exploit by setting a particular type of "attribute" associated with the cookie that can be used to influence the browser's behavior. Thus, for example, one type of attribute is a "secure" attribute. When this attribute is set, the browser only presents the cookie over encrypted (SSL-secured) channels; this approach provides some degree of security for the cookie by ensuring that it is delivered over the wire only in encrypted form. Another type of attribute is the "domain" attribute. If a cookie's domain attribute is not set, the browser presents the cookie to the issuing server only. Using the domain attribute, the browser can be controlled so that it presents the cookie to a server that is presumably trusted. Yet another cookie attribute is an "http only" attribute. Setting a cookie's http-only attribute blocks client-side script access to a cookie, an approach which provides some protection against cross-site scripting (XSS) attacks.

While these approaches provide some security benefits, they do not always produce satisfactory results. Thus, for example, when the http-only attribute is set, XSS attacks may be minimized, but this approach has a significant downside because it blocks even a trusted site's access to the cookie by client-side scripts. Thus, use of cookie attributes for security often comes with a trade-off. Moreover, even when an attribute can be used to provide some protection, sophisticated attacks can defeat their usefulness. An example of this scenario is the domain attribute, which provides no protection in the event the domain name system itself is compromised, even if the secure attribute is set.

The disclosed subject matter addresses these and other deficiencies in the prior art.

BRIEF SUMMARY

According to this disclosure, a new cookie attribute is defined for use during secure transport (https) sessions that are established between a web browser and a set of web applications. This attribute is referred to herein as a "certificate attribute" or "server certificate attribute" (servcertid). The server certificate attribute points to a server-supplied certificate and, in particular, a digital certificate, such as an X.509 digital certificate The cookie attribute includes a value, and that value is designed to correspond to one or more content fields in the digital certificate. The server certificate attribute value can be set to "match" on any content field or fields within a conventional digital certificate. In use, when a browser visits a web application and an SSL (or TLS, or equivalent) connection is established, an SSL-secured web page is returned to the browser, together with a cookie. The cookie has the server certificate attribute set to a value that may be matched against a content field in a digital certificate. Later, when the browser is opened to a second web application and receives a server certificate during the SSL setup, client-side code associated with the browser checks for a "match" before sending the cookie to the server that has served the certificate. This approach ensures that the cookie is presented only over specified https connections and to trusted organizations (as identified by the servcertid value(s) encoded in the attribute).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
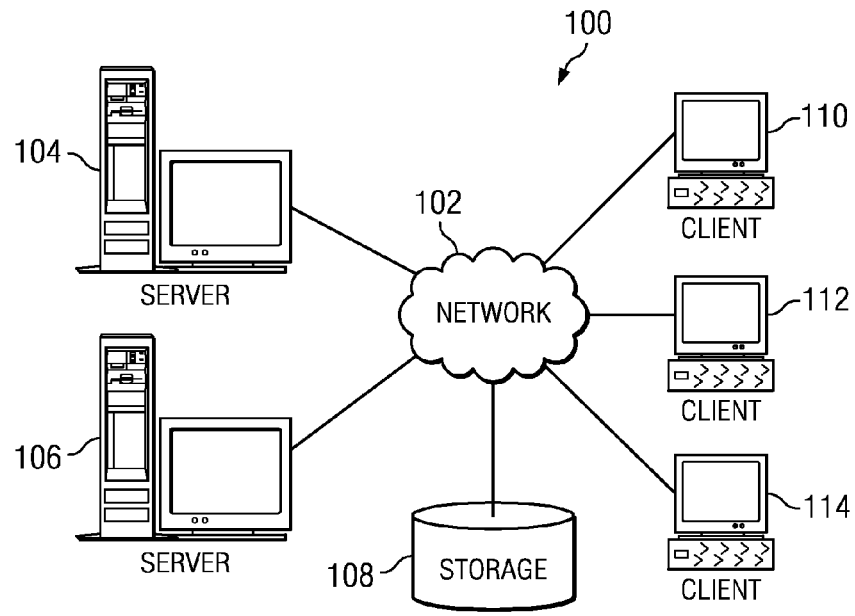
FIG. 1 depicts an exemplary block diagram of a distributed data processing environment in which exemplary aspects of the illustrative embodiments may be implemented.
Figure 2:
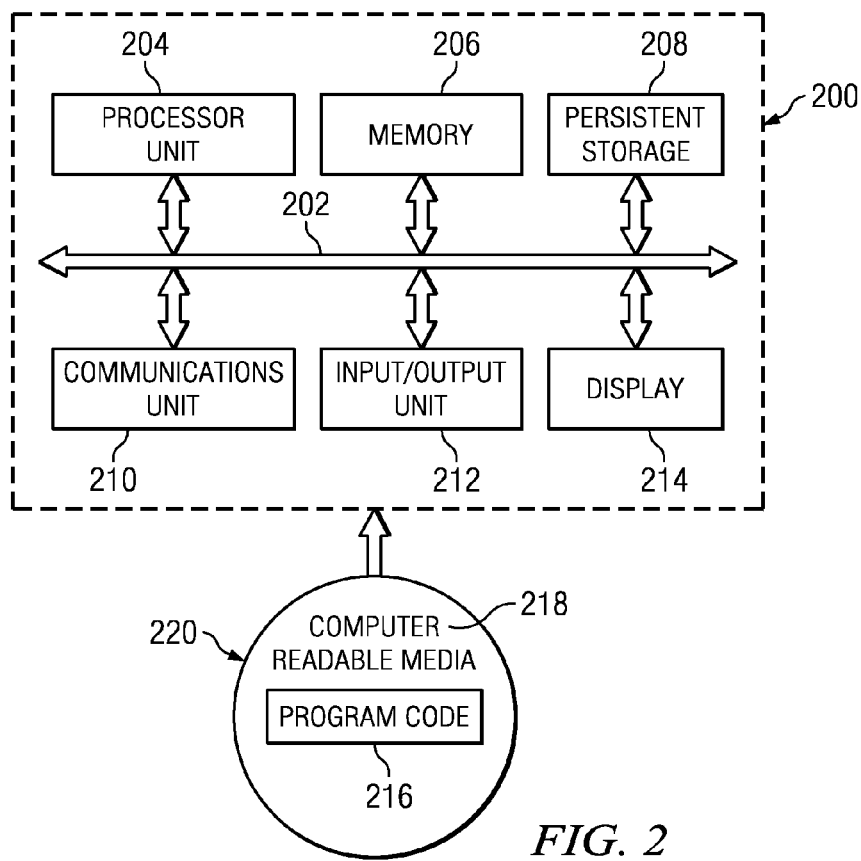
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented.

The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As is well-known, a secure transport layer may be established between a client running a web browser, and a server executing a web application, so that communications between these processes are encrypted. The secure transport layer typically is established using Secure Sockets Layer (SSL), an Internet standard technology. In SSL, also known as Transport Layer Security (TLS)) so-called "certificates" may facilitate the establishment of the secure connections between two computers, such as between a client and a server in FIG. 1. An SSL certificate is an electronic certificate/document that attests to the binding of a public encryption key to an individual or computer. Some SSL/TLS implementations may use cipher suites (such as Diffie-Hellman) that do not require certificates. The SSL certificate allows verification of a claim by the individual or computer that a specific public key is associated with the individual or computer. This allows another party to be assured that the individual or computer is the entity to which this other party intends to communicate. The SSL certificate can be "self-signed" or "certificate-authority signed." A "self-signed" certificate is a certificate issued by the individual or computer where the individual or computer itself vouches that the individual or computer identified in the certificate is associated with the public key contained in the certificate. A "certificate-authority signed" certificate is a certificate issued by a trusted, third party (i.e. a "certificate authority") which vouches that the individual or computer identified in the certificate is associated with the public key contained in the certificate.

The following describes example of a known use of an SSL certificate, with reference to FIG. 1. IETF RFC 5246 may be consulted for details of the TLS handshake. Generally, the handshake involves the client 110 requesting an SSL connection using a ClientHello message. The server 104 responds with a ServerHello message and then sends it server certificate independently of any request by the client. The server controls the cipher suite used. The SSL certificate provided by the server 104 typically has a known format, such as X.509v3 format, although this is not a limitation. The server either "self-signed" the certificate or obtained certificate-authority signing of the SSL certificate. The server has stored the SSL certificate in a server database. The SSL certificate includes either a fully-qualified "distinguished" name of the host or a short name of the host. The fully-qualified distinguished name includes the host name and host domain name. The short name includes the host name but not the host domain name; in some environments there is no domain name for the host. In both cases, the SSL certificate may optionally include a list of IP addresses of the host, as an extension of the SSL certificate. Also, in both cases, the SSL certificate specifies a public key used to encrypt some subsequent messages between the client and server. When the client 110 receives the SSL certificate from the server 104, the client compares the host name and host domain name, host name or IP address in the original request made by the client to the distinguished name, short name certificate extension, if any, or IP address certificate extensions, if any, in the SSL certificate. If the host name and domain name, host name, or IP address match, then the client is confident that the server is the intended communication partner, and it proceeds to establish an (encrypted) SSL connection with the server. SSL transport occurs over the https protocol, as opposed to http. In particular, the client uses the public key to create another session encryption key to encrypt the subsequent messages in the session. The server likewise uses this same session encryption key.

Figure 3:
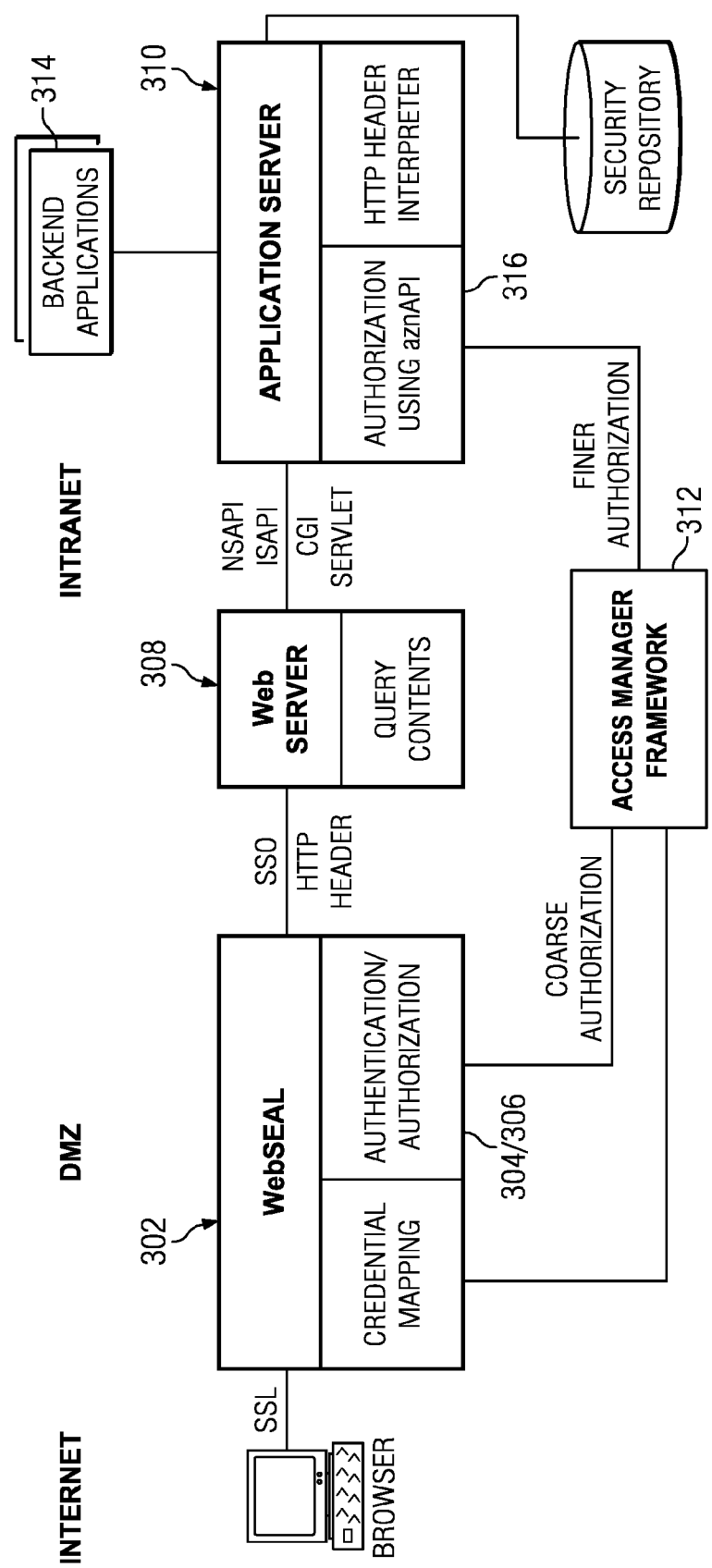
FIG. 3 illustrates a Web portal having an access management framework in which the subject disclosure may be implemented.

Although not meant to be limiting, the technique that is the subject of this disclosure typically is implemented in an enterprise system that includes an access manager that controls access to enterprise resources including, without limitation, web applications. A representative access manager configuration is represented in FIG. 3. More broadly, any system, device, program or process that provides a policy/access/service decision may be used for this purpose. A representative but non-limiting implementation is a point of contact (PoC) that acts as an intermediary between a client browser and one or more back end applications. A back end application is a web application, and the application includes a cookie setting mechanism, as is well-known. The point of contact is a reverse proxy, a Web server plug-in, or the like, that is executed in at least one processor. This component also is responsible for the session management of users.

FIG. 3 also illustrates how access manager is integrated in a Web portal to provide authorization and access control services for Web resources. A multi-threaded Web server 302, an access manager component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from the access manager component 302 can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the component 302). Information passed from the component 302 and obtained from the access manager framework 312 can be used to make access decisions to back end applications.

The access manager typically provides a reverse proxy, web plug-in or the like that provides session management functionality and that includes authorization functionality as part of this session management. Authentication is handled by the access manager, meaning that it collects a user's authentication credentials, evaluates them, and establishes a session, including some form of session management functionality (such as a session cookie). To provide a user with the advantages of this consolidated environment, the access manager then provides a single sign-on solution for the user by asserting authentication credentials (such as username/password) to the back-end applications. This allows the back-end application to be added to the portal environment without modification.

Figure 4:
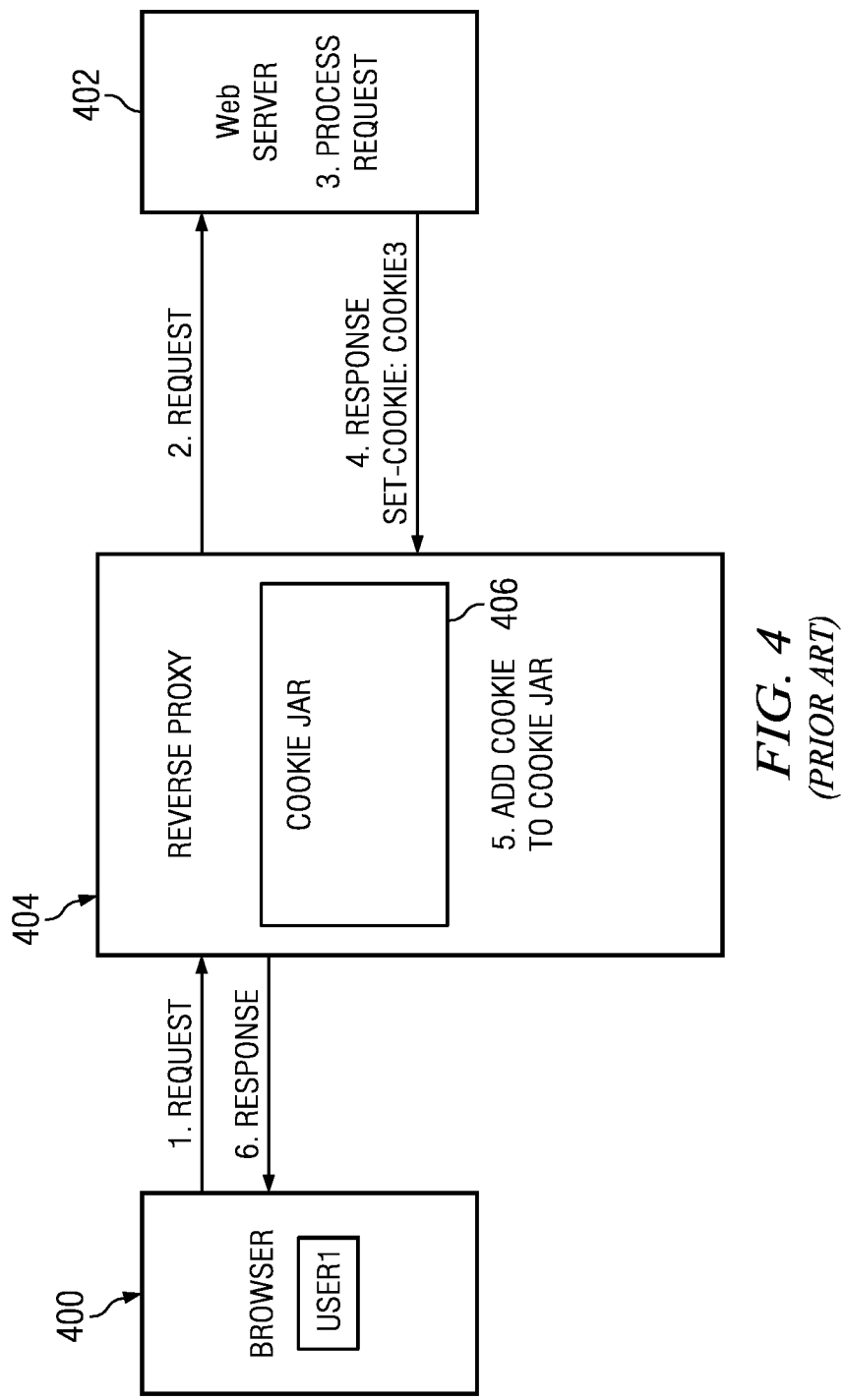
FIG. 4 is a simplified block diagram of a web browser interacting with a backend application through a reverse proxy that stores cookies in a session cache or "cookie jar"

FIG. 4 is a simplified block diagram showing an example information flow without the techniques of this disclosure. In this example, a user (User1) of web browser 400 has established an existing authentication session with backend web server 402 using the reverse proxy 404, such as the access manager described above. The proxy includes a session cache 406 (or "cookie jar") that is instantiated on a per-user session basis. In step (1), the user uses the web browser 400 to make an https request to the web server 402 via the reverse proxy 404. The reverse proxy 404 receives the request and, at step (2), passes it to the web server 402. The web server 402 process the request at step (3). At step (4), the web server 402 returns a response to the reverse proxy 404 containing a Set-Cookie HTTP header. At step (5), the reverse proxy 404 detects the Set-Cookie header and adds the cookie to its cookie jar 406 for the authenticated user. At step (6), the reverse proxy sends the response back to the web browser 400. The cookie includes one or more cookie attributes, such as a "secure" attribute, a "domain" attribute, or the like.

With the above as background, the subject matter of this disclosure can now be described. In this context of this disclosure, it is assumed that all browser-to-server communications take place over a secure transport, such as SSL (or TLS, or equivalent) over TCP over IP. This transport is well-known in the art, and it creates an "https session" between the browser and the server. Familiarity with SSL/TLS transport is assumed. The techniques may be used with other secure transport protocols that implement certificate-based cipher suites.

Figure 5:
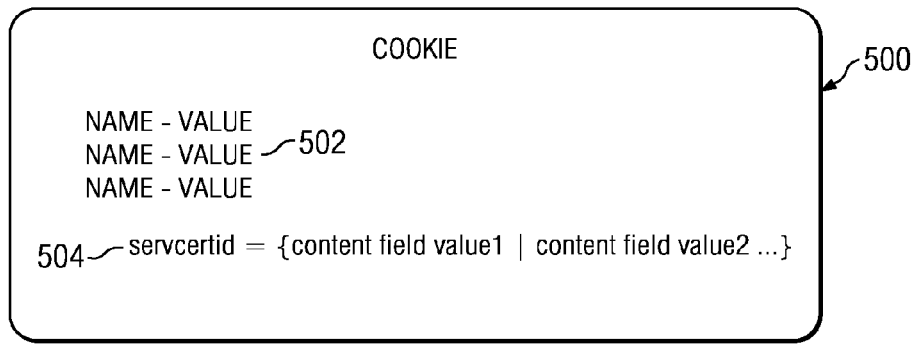
FIG. 5 illustrates a cookie that includes the server certificate attribute described herein.

According to this disclosure, a new cookie attribute is defined for cookie 500, as shown in FIG. 5. Cookie 500 typically is a text file having one or more name-value pairs 502. One of these pairs is a "certificate attribute" 504, or "server certificate attribute," or servcertid. This attribute is adapted to point to a server-supplied certificate and, in particular, a digital certificate, such as an X.509 digital certificate. As illustrated, the cookie attribute includes a value, and that value is designed to correspond to one or more content fields in the digital certificate.

Figure 6:
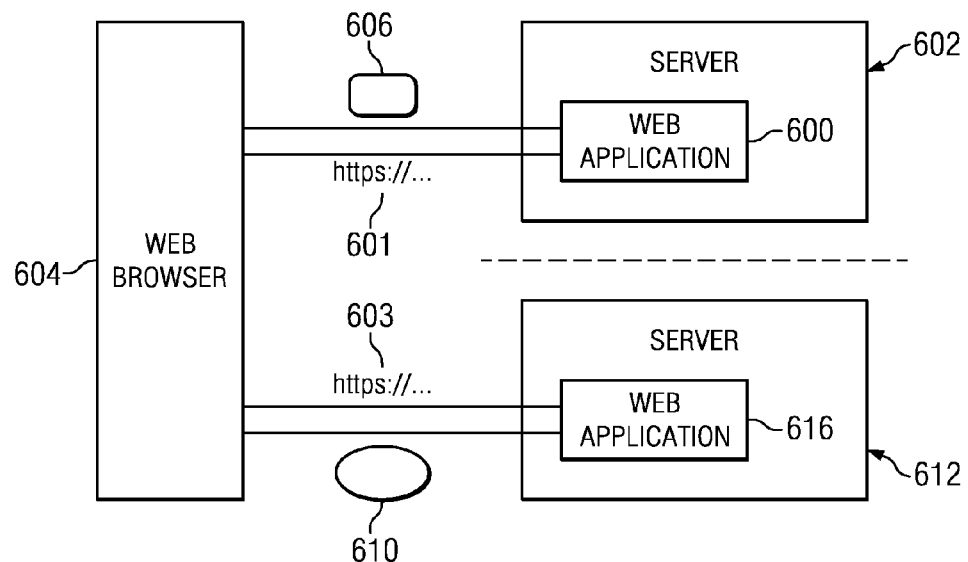
FIG. 6 illustrates how the cookie shown in FIG. 5 is secured according to the technique described herein.

As seen in FIG. 6, and according to one embodiment, during a first https session 601, a first web application 600 executing on a first server 602 provides a web browser 604 with the cookie 606 having the server certificate identifier attribute set to a value corresponding to a content field in a server certificate. The cookie 606 is stored in the browser (typically in a browser cookie cache). Later, when the browser 604 is accessing a second server 612 during a second https session 603 that differs from the first https session 601, the browser 604 verifies that the value in the cookie matches a corresponding value in the server certificate 610 received from the second server 612 (during the setup of the second https session 603) before sending the cookie to the second server. This approach ensures that the cookie is presented only over specified https connections and to trusted organizations (as identified by the servcertid value(s) encoded in the attribute).

In a concrete example, the first server 602 uses a server certificate issued by certificate authority CA1 with serial number 9990, and which has the Subject>organization O=IBM. When the first server 602 returns the cookie 606 to the web browser, it sets cookie1=value 1 with attribute servcertid=O.CA1.9990. Later, when the browser 604 establishes the second https connection 603 with the second server 612, the second server provides the server certificate 610, for example, a certificate issued by certificate authority CA1 with serial number 9991 and Subject>organization O=IBM. The browser cache management logic, knowing that 9991 was granted by CA1, then checks that O=IBM (the content field) in the certificate and sees that there is a match to the server certificate attribute. As a result, the browser can then trust the second server. It then sends the cookie 606 to the web application executing on the second server.

According to another embodiment, the cookie also includes one or more other attributes. One such attribute is a domain attribute. In this embodiment, the cookie is sent to the second server only if both the value of the attribute matches the corresponding value in the server certificate supplied by the second server, and also the domain (and, optionally, the path) also "match" a corresponding value in the domain attribute.

The attribute may identify a certificate, or a set of certificates.

Figure 7:
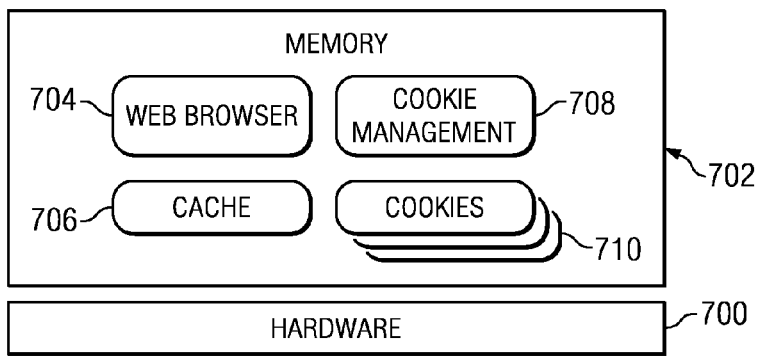
FIG. 7 is a simplified block diagram of cookie management functionality that is implemented within client code to secure the cookie.

FIG. 7 illustrates representative functionality on a client to implement this functionality. The client may be implemented using the hardware and software described above with respect to FIG. 2. In a typical implementation, the client comprises hardware 700, memory 702, a web browser 704, a cache 706, and cookie management code 708 executed by a processor of the hardware. The cookie management code 708 may be implemented in any convenient manner, such as native browser code, as a browser plug-in, an applet, or as a script. The cache 706 stores cookies, at least one of which 710 includes the server certificate attribute, as has been described. When the browser 704 establishes an https connection to a target server, it receives a server certificate in the usual manner. The certificate includes one or more X.509 content fields. The cookie management code 708 compares the "value" in the server certificate attribute with the identified content field or fields in the server certificate to determine whether the cookie 708 should be sent to the target server. In particular, if the cookie management code 708 identifies a "match" between the values, the cookie is sent to the target server; otherwise, the cookie is not sent. In this manner, the browser 704 is assured that the target server is trusted.

The particular semantics of the servcertid attribute are not limited to any particular value content field of the digital certificate. Thus, for example, the attribute may correspond to one or more of the following content fields: Subject, Subject organization, Subject unique identifier, Issuer, Issuer unique identifier, Serial Number, a key referencing X.509 structure, or some combination thereof. For example, servcertid=O.<issuer>.<serial number>, specifies to the browser that it present the cookie with all requests made over an https connection using certificates for the same organization (O) as specified by the <serial number>'s certificate organization. Generalizing, the server certificate attribute may point to any X.509 content field, or a combination of such fields concatenated together, and such information also may be augmented or supplemented with additional information (other than X.509 data) if desired.

Figure 8:
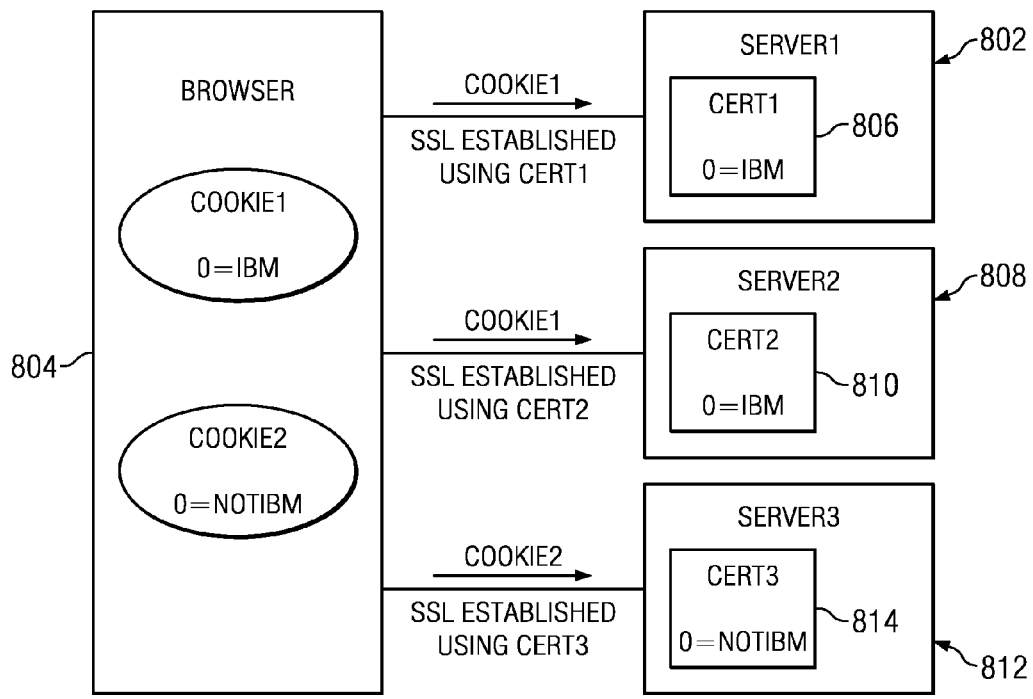
FIG. 8 illustrates an embodiment wherein two different SSL tunnels are created with two different digital certificates granted to the same organization.

Typically, the above-described approach is used when two (2) different SSL tunnels are created with two (2) different certificates granted to the same organization. This is illustrated in FIG. 8. In this embodiment, first server 802 provides browser 804 with first certificate 806 with a content field identifying the organization (e.g., O=IBM). Second server 808 provides browser 804 with second certificate 810 including the same content field value. Third server 812 is external to the domain and provides browser with third certificate 814 that includes a different content value (e.g., O=NOTIBM). As described in this example, distinct web applications for the same organization can have distinct server certificates. According to the approach herein, cookie1 is provided to both the first server and the second server, which are trusted by the browser, but not the third server, which is not.

The subject matter described herein has many advantages. It ensures that the cookie is presented over specified secure transport connections, which serves to guard against network vulnerabilities. The technique also ensures that the cookie is presented only to trusted organizations, which serves to guard against DNS-based vulnerabilities, and cross-site scripting (XSS) attacks (against cookies). The approach has the further advantage is that it enables client-side functionality that would otherwise be disabled by known prior art approaches, such as the use of the http-only cookie attribute. A further advantage is that the approach can be used with any legacy digital certificate, and there is no requirement that the certificate be modified in any manner. Rather, and as described above, the server certificate attribute value can be set to match on any content field or fields within a conventional digital certificate. The client-side code merely checks for this "match" before sending the cookie to the server that has served the certificate in the usual manner.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The proxy may be located in a domain that differs from the domain of one or more back-end applications and, thus, the techniques herein may be practiced in a loosely-coupled server (including a "cloud"-based) environment. The proxy itself may be hosted in the cloud, in which case it can provide single sign-on to applications running in a third party environment as well as the single sign-off functionality described herein.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the managed cookie functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the cookie management components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises managed cookie framework that provides single sign-off in a proxy.

The cookie function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

The term "cookie" should be broadly construed to refer to an HTTP cookie (RFC6265) or, more generally, any data structure that includes session-specific data associated with the server-side instance that returns that data structure.

Having described the invention, what is now claimed is as follows.

The invention claimed is:

1. A web security method, comprising:
during a first secure transport session with a first server, receiving a cookie having an attribute that identifies a first server certificate associated with the first server, the attribute having a value for use in determining a characteristic associated with a second server certificate distinct from the first server certificate;
during setup of a second secure transport session with a second server distinct from the first server:
receiving the second server certificate, the second server certificate associated with the second server;
comparing information in the second server certificate to the value of the attribute; and
responsive to a match between the information in the second server certificate and the value of the attribute, sending to the second server the cookie received from the first server during the first secure transport session to facilitate completion of the setup of the second secure transport session;
wherein at least one of the comparing and sending steps are carried out by software executing in a hardware element.

2. The method as described in claim 1 wherein the first server and the second server are associated with a same organization.

3. The method as described in claim 1 wherein the attribute is a server certificate identifier attribute.

4. The method as described in claim 1 wherein the value of the attribute is a content value of a digital certificate.

5. The method as described in claim 4 wherein the digital certificate is an X.509 digital certificate.

6. The method as described in claim 1 wherein the cookie also includes a domain attribute.

7. The method as described in claim 6 further including verifying that the second server is associated with a domain identified in the domain attribute prior to sending the cookie to the second server.

8. The method as described in claim 1 wherein the secure transport is SSL/TLS.

9. The method as described in claim 1 wherein the value represents data from two or more fields of the second server certificate concatenated together.

10. The method as described in claim 1 wherein the value represents data from two or more fields of the second server certificate concatenated together augmented with additional information other than data derived from the second server certificate.

11. The method as described in claim 1 wherein the characteristic is that the second server certificate is associated with a trusted server.

\* \* \* \* \*